United States Patent
Ives et al.

(10) Patent No.: US 12,519,884 B2
(45) Date of Patent: Jan. 6, 2026

(54) DUAL SIM SUPPORT FOR CALL SETTINGS

(71) Applicant: T-MOBILE INNOVATIONS LLC, Overland Park, KS (US)

(72) Inventors: Derrick Lynn Ives, North Bend, WA (US); Melodie Magdalene Sobrenilla, Sumner, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 414 days.

(21) Appl. No.: 18/147,419

(22) Filed: Dec. 28, 2022

(65) Prior Publication Data

US 2024/0223704 A1 Jul. 4, 2024

(51) Int. Cl.
*H04M 3/436* (2006.01)
*H04W 8/18* (2009.01)
*H04W 88/06* (2009.01)

(52) U.S. Cl.
CPC ......... *H04M 3/4365* (2013.01); *H04W 8/183* (2013.01); *H04W 88/06* (2013.01)

(58) Field of Classification Search
CPC .... H04M 3/4365; H04W 8/183; H04W 88/06
USPC .......................................................... 455/415
See application file for complete search history.

(56) References Cited

U.S. PATENT DOCUMENTS

| | | | |
|---|---|---|---|
| 2017/0048773 A1* | 2/2017 | Miao | H04W 48/18 |
| 2018/0324299 A1* | 11/2018 | Sial | H04W 4/16 |
| 2019/0116488 A1* | 4/2019 | Kumar | H04W 4/24 |
| 2022/0360664 A1* | 11/2022 | Lovlekar | H04W 76/16 |
| 2023/0319655 A1* | 10/2023 | Han | H04W 36/14 |
| | | | 370/331 |
| 2024/0015247 A1* | 1/2024 | Phinn | H04M 3/54 |
| 2024/0396999 A1* | 11/2024 | Ngai | H04M 3/541 |

* cited by examiner

*Primary Examiner* — Hirdepal Singh
(74) *Attorney, Agent, or Firm* — Shook, Hardy & Bacon; Elena K. McFarland

(57) ABSTRACT

According to aspects herein, methods and systems for management of a user device operating using a dual subscriber identification module (SIM) system. Each SIM within the Dual SIM system may have particular set of call preferences. When receiving a communication, a network may access the call preferences associated with the SIM and determine how to manage the communication. An incoming call may be managed differently between the two SIMs for the user device based on user preferences. A user may input preferences for each SIM within a user preference manager.

20 Claims, 3 Drawing Sheets

DUAL SIM SUPPORT FOR CALL SETTINGS

BACKGROUND

In the network environment, people receive many scam-related communications that take up valuable time and network resources. Call settings may allow the user to reject or allow calls based on a user-specified setting. Additionally, user devices now enable authentication on multiple subscriber identity modules per device. As such, there stands a need to manage call settings across multiple subscriber identify modules (SIMs) for a single device.

SUMMARY

The present disclosure is directed to managing a user device operating on a dual subscriber identity module wireless device and applications utilizing a wireless connection to a telecommunication network, substantially as shown and/or described in connection with at least one of the Figures, and as set forth more completely in the claims.

Subscribers in a wireless communication network are typically assigned subscriber identity information, which may for example be stored using a subscriber identity module (SIM) in the subscriber's wireless device. A user equipment device (UE), e.g., a wireless device such as a cellular phone, may be capable of using multiple SIMs. For example, a Dual SIM Dual Standby (DSDS) UE may comprise a single transmitter that may be shared between SIMs and one or more receivers. Traditional UEs operating on with a single SIM may specify call setting such as scam settings and the like. However, when moving to a DSDS UE, there is currently no way to specify call settings for each SIM.

According to various aspects of the technology described herein, each SIM within the UE may be configurable to specify call settings for calls or communications directed to each SIM. Various situations require that different communications are managed differently depending on the call settings specified. Additionally, each SIM may be used for different tasks or situations and may require different call management. When a network receives a call that is directed to one of the multiple SIMs for a DSDS UE, the network may identify a SIM specific call setting such as a call blockage or scam setting. Once the setting is identified, the network may manage the call based on those settings.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
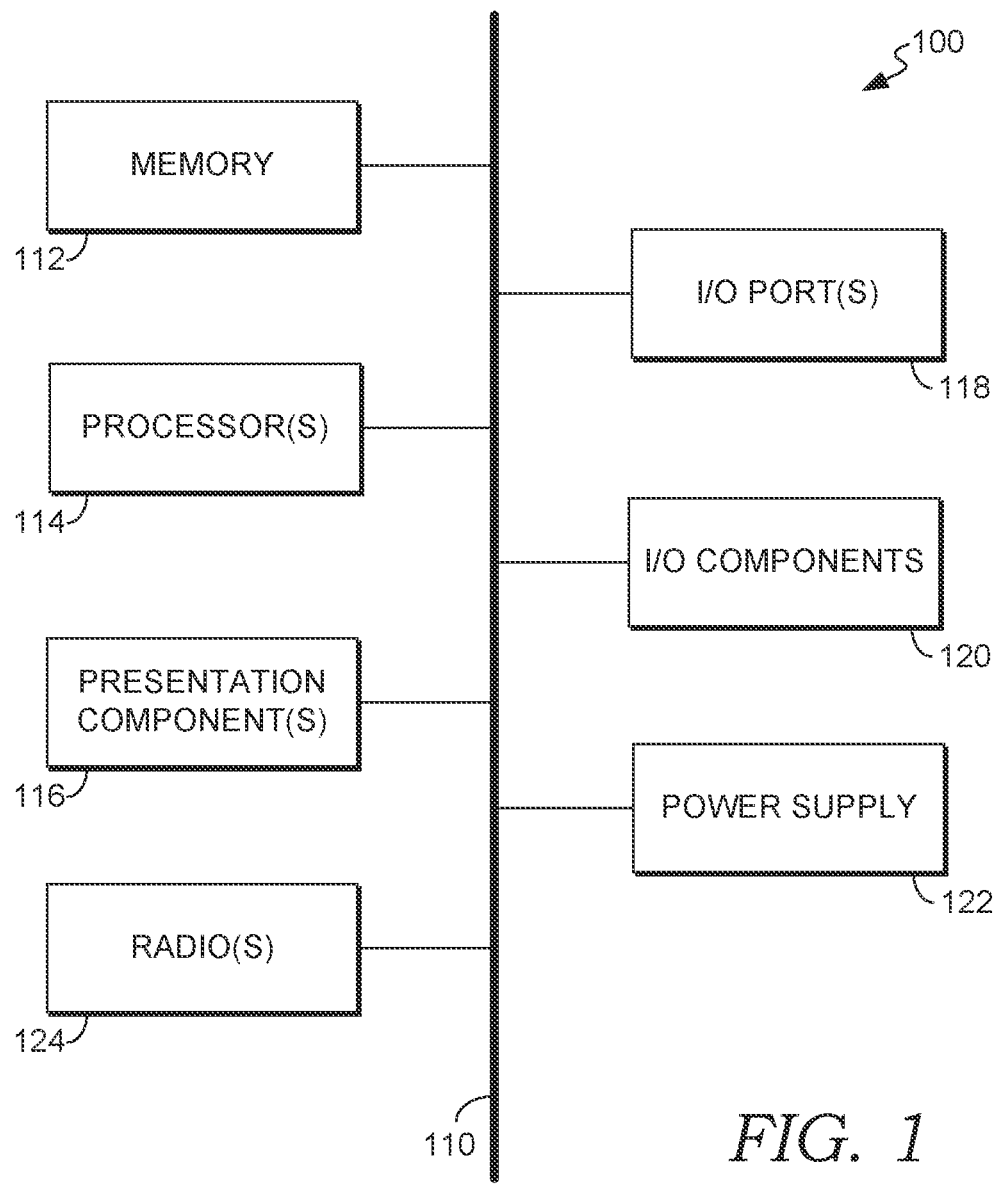
FIG. 1 depicts a computing environment suitable for use in implementations of the present disclosure, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Various technical terms are used throughout this description. An illustrative resource that fleshes out various aspects of these terms can be found in Newton's Telecom Dictionary, 32nd Edition (2022).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Wireless communication systems are rapidly growing in usage. Further, wireless communication technology has evolved from voice-only communications to also include the transmission of data, such as Internet and multimedia content. In order to enable their wireless device to access a wireless communication network (e.g., a cellular telecommunication network) which provides such services, a user may in some cases be required to subscribe to a service provider (a "carrier"), who in turn may provide such services to the user, e.g., via a wireless communication network which they operate.

Such subscribers in a wireless communication network are typically assigned subscriber identity information, which may for example be stored using a SIM in the subscriber's wireless device. For example, a commonly-used type of subscriber identity information is an International Mobile Subscriber Identity (IMSI), which identifies a subscriber's wireless device in their carrier's network. A user equipment device (UE), e.g., a wireless device such as a cellular phone, may be capable of using multiple SIMs. For example, a Dual SIM Dual Standby (DSDS) UE may comprise a single transmitter that may be shared between SIMs and one or more receivers.

The inclusion of two or more SIM cards in embodiments of a UE may allow the UE to support two different telephone numbers and may allow the UE to communicate on corresponding two or more respective networks. For example, a first card may comprise SIM functionality to support a first telephone number on the UE, and a second card may comprise SIM functionality to support a second telephone number on the UE. Where the UE comprises two cards, the UE may support Dual SIM Dual Standby (DSDS) functionality. The DSDS functionality may allow the UE to be connected to a first network performing a first active call and to receive a second call at the same time. Thus the DSDS functionality may allow either or both of the two cards in the UE to be on standby waiting for a voice call and/or data connection. In some embodiments of DSDS, when a call/data is established on one SIM, the other SIM is no longer active.

As such, various communication preferences may be shared between the SIMs associated with a particular UE. Additionally, it is desirable to have different communication preferences for each SIM within the dual SIM environment. The present disclosure provides for a system that is able to tailor a user's communication experience to the preferences specified for each SIM. A first SIM may require that all scam calls are blocked while the second SIM may require that all scam calls are permitted.

In accordance with a first aspect of the present disclosure, a method for managing a call preferences within a dual SIM device is provided. The method begins with receiving from a first user device, by a network, a first request to communicate with a second user device. Subsequently, the method provides for determining, by the network, that the second user device is operating using two or more SIMs device. Next the network determines that the first request to communicate with the second user device is associated with a first SIM of the two or more SIMs. Additionally, the network accesses a set of call preferences associated with the first SIM and determines based on the set of call preferences associated with the first SIM, that the first request to communicate with the second user device is not permitted. Finally the network may reject the first request to communicate with the second user device.

A second aspect of the present disclosure is directed to one or more non-transitory computer-readable media having computer-executable instructions embodied thereon that, when executed, perform a method. The method begins with receiving from a first user device, by a network, a first request to communicate with a second user device. Subsequently, the method provides for determining, by the network, that the second user device is operating using two or more SIMs device. Next, the network determines that the first request to communicate with the second user device is associated with a first SIM of the two or more SIMs. Additionally, the network accesses a set of call preferences associated with the first SIM and determines based on the set of call preferences associated with the first SIM, that the first request to communicate with the second user device is not permitted. Finally the network may reject the first request to communicate with the second user device.

Another aspect of the present disclosure is directed to a non-transitory computer storage media storing computer-usable instructions that, that when used by the processor, cause the processor to perform the following operations: receive from a first user device, by a network, a first request to communicate with a second user device. Subsequently, the system provides for determining, by the network, that the second user device is operating using two or more SIMs device. Next the system determines that the first request to communicate with the second user device is associated with a first SIM of the two or more SIMs. Additionally, the system accesses a set of call preferences associated with the first SIM and determines based on the set of call preferences associated with the first SIM, that the first request to communicate with the second user device is permitted with a first notification. Finally the system may communicate the first request to communicate with the second user device to the second user device using the first notification.

FIG. 1 depicts a computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 112, I/O components 110, radio 116, transmitter 118, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 110. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, non-removable, or a combination thereof. Exemplary memory includes solid-state memory, hard drives, optical-disc drives, etc. Computing device 100 includes one or more processors 106 that read data from various entities such as bus 102, memory 104 or I/O components 110. One or more presentation components 108 present data indications to a person or other device. Exemplary one or more presentation components 108 include a display device, speaker, printing component, vibrating component, etc. I/O ports 112 allow computing device 100 to be logically coupled to other devices including I/O components 110, some of which may be built into computing device 100. Illustrative I/O components 110 include a microphone, joystick, game pad, satellite dish, scanner, printer, wireless device, etc.

The radio 116 represents one or more radios that facilitate communication with a wireless telecommunications network. While a single radio 116 is shown in FIG. 1, it is contemplated that there may be more than one radio 116 coupled to the bus 102. In aspects, the radio 116 utilizes a transmitter 118 to communicate with the wireless telecommunications network. It is expressly conceived that a computing device with more than one radio 116 could facilitate communication with the wireless telecommunications network via both the first transmitter 118 and an additional transmitters (e.g. a second transmitter). Illustrative wireless telecommunications technologies include CDMA, GPRS, TDMA, GSM, and the like. The radio 116 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
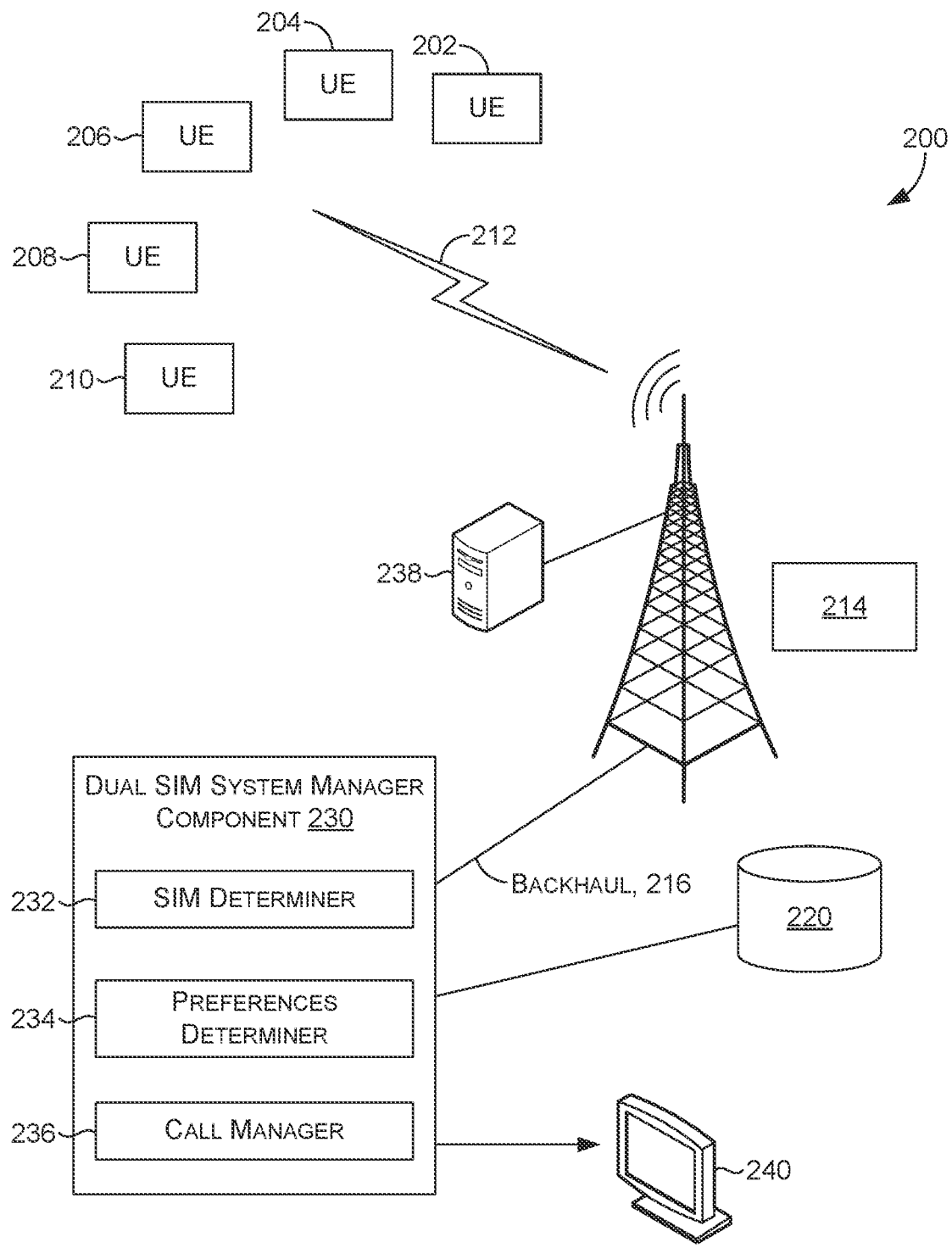
FIG. 2 depicts a diagram of an exemplary network environment in which implementations of the present disclosure may be employed, in accordance with aspects herein.

FIG. 2 depicts a diagram of an exemplary network environment in which implementations of the present disclosure may be employed. Such a network environment is illustrated and designated generally as network environment 200. Network environment 200 is not to be interpreted as having any dependency or requirement relating to any one or combination of components illustrated.

Network environment 200 includes user devices (UE) 202, 204, 206, 208, and 210, access point 214 (which may be a cell site, base station, or the like), and one or more communication channels 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network.

As used herein, UE such as UEs 202-210 (also referenced herein as a user device or a wireless communication device) can include any device employed by an end-user to communicate with a wireless telecommunications network. Each of the UEs 202, 204, 206, 208, and 210 can include a mobile device, a mobile broadband adapter, a fixed location or temporarily fixed location device, or any other communications device employed to communicate with the wireless telecommunications network. For an illustrative example, each of the UEs 202, 204, 206, 208, and 210 can include cell phones, smartphones, tablets, laptops, small cell network devices (such as micro cell, pico cell, femto cell, or similar devices), and so forth. Further, each of the UEs 202, 204, 206, 208, and 210 can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. Each of the UEs 202, 204, 206, 208, and 210, as one of ordinary skill in the art may appreciate, generally includes one or more antennas coupled to a radio for exchanging (e.g., transmitting and receiving) transmissions with a nearby base station or access point.

In some aspects, each of the UEs 202, 204, 206, 208, and 210 may correspond to computing device 100 in FIG. 1. Thus, a UE can include, for example, a display(s), a power source(s) (e.g., a battery), a data store(s), a speaker(s), memory, a buffer(s), a radio(s) and the like. In some implementations, for example, UEs 202, 204, 206, 208, and 210 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network. Each of the UEs 202, 204, 206, 208, and 210 are capable receive incoming communications and/or send communications through the access point 214.

In some cases, UEs 202, 204, 206, 208, and 210 in network environment 200 can optionally utilize one or more communication channels 212 to communicate with other computing devices (e.g., a mobile device(s), a server(s), a personal computer(s), etc.) through access point 214. The network environment 200 may be comprised of a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network environment 200 can include multiple networks, as well as being a network of networks, but is shown in more simple form so as to not obscure other aspects of the present disclosure.

In some embodiments, the UEs 202-210 comprise at least one module, wherein the module may be in the form of a physical card or one or more software/firmware modules, such as a SIM, a universal integrated circuit care (UICC), which executes one or more Subscriber Identity Module (SIM) applications and/or otherwise implements SIM functionality. In some embodiments, one or more of UEs 202-210 include two or more SIMs. Each SIM may be embedded, e.g., may be soldered onto a circuit board of the UEs 202-210, or each SIM card may be implemented as a removable card. Thus, the module(s) may be removable cards (such as UICC cards, which are sometimes referred to as "SIM cards"), and/or the card(s) may be embedded cards (such as embedded UICCs (eUICCs), which are sometimes referred to as "eSIMs" or "eSIM cards"). In some embodiments (such as when the card(s) include an eUICC), one or more of the SIM(s) may implement embedded SIM (eSIM) functionality. In such embodiments, one of the card(s) may execute multiple SIM applications. Each of the card(s) may include components such as a processor and a memory. Instructions for performing SIM/eSIM functionality may be stored in the memory and executed by the processor. In some embodiments, the UEs 202-210 may comprise a combination of removable cards and fixed/non-removable cards (such as one or more eUICC cards that implement eSIM functionality), as desired. For example, the UEs 202-210 may comprise two embedded cards, two removable cards, or a combination of one embedded card and one removable card. Various other SIM configurations are also contemplated.

The one or more communication channels 212 can be part of a telecommunication network that connects subscribers to their immediate telecommunications service provider (i.e., home network carrier). In some instances, the one or more communication channels 212 can be associated with a telecommunications provider that provides services (e.g., 3G network, 4G network, LTE network, 5G network, 6G network, and the like) to user devices, such as UEs 202, 204, 206, 208, and 210. For example, the one or more communication channels may provide voice, SMS, and/or data services to UEs 202, 204, 206, 208, and 210, or corresponding users that are registered or subscribed to utilize the services provided by the telecommunications service provider. The one or more communication channels 212 can comprise, for example, a 1× circuit voice, a 3G network (e.g., CDMA, CDMA2000, WCDMA, GSM, UMTS), a 4G network (WiMAX, LTE, HSDPA), a 5G network, or a 6G network.

In some implementations, access point 214 is configured to communicate with a UE, such as one of UEs 202, 204, 206, 208, and 210, that are located within the geographic area, or cell, covered by radio antennas of access point 214. Access point 214 may include one or more base stations, base transmitter stations, radios, antennas, antenna arrays, power amplifiers, transmitters/receivers, digital signal processors, control electronics, GPS equipment, and the like. In particular, access point 214 may selectively communicate with the UEs using dynamic beamforming.

As shown, access point 214 is in communication with a dual SIM system manager 230 and at least a network database 220 via a backhaul channel 216. The access point may also host a server 244 that stores applications and metaverse content that are frequently requested by users in the vicinity of access point 214. As the UEs 202, 204, 206, 208, and 210 collect individual preference data, the preference data can be automatically communicated by each of the UEs 202, 204, 206, 208, and 210 to the access point 214. Access point 214 may store the data communicated by the UEs 202, 204, 206, 208, and 210 at a network database 220. Alternatively, the access point 214 may automatically retrieve the personal or user data from the UEs 202, 204, 206, 208, and 210, and similarly store the data in the network database 220.

As described above, the preference data collected by the UEs 202, 204, 206, 208, and 210 can include, for example, scam call preference information for each SIM operating for a UE, historical scam settings, historical scam interactions, and the like. In one embodiment, the historical information includes prior interactions the user has had with likely scam calls or any other interactions that may be stored within the database. Historical scam information and historical scam interactions may be stored therein. The network database 220 may be user specific and store information related to the user of each UE 202-210. Each user may have a separate account and profile stored with the network database 220. The profile will have information and preferences related to the Dual SIM system manager 230. Each SIM for each UE will have its own scam preferences and settings stored within database 220.

The dual SIM system manager component 230 comprises various engines including a SIM determiner 232, a preference determiner 234, and a call manager 236 may be stored at the network database 220. Although the dual SIM system manager component 230 is shown as a single component comprising the SIM determiner 232, the preference determiner 234, and the call manager 236, it is also contemplated that each of the SIM determiner 232, the preference determiner 234, and the call manager 236 may reside at different locations, be its own separate entity, and the like, within the home network carrier system.

The user may be able to access the dual SIM system manager 230 and provide personalized scam call or scam communication settings to the application for each SIM operating on a dual SIM system. For example, the user of a UE may input scam settings into the dual SIM system manager 230 that may be saved on the database 220. The scam settings or call preferences may be tailored for each SIM operating on a dual SIM system. A first number associated with a first SIM may have the settings set to restrict all calls that are scam likely. A second number associated with a second SIM may have the scam settings set to allow all calls. Additionally, the user scam preferences may instruction the dual SIM system manager 230 to have the same preferences for each phone number or different setting depending on the time of day. Other preferences may be selected to tailor the user's experience on the duel SIM system. For example, the dual SIM system manager 230 may be used to implement a number of other user settings. A first SIM may be associated with a first set of settings. The first set of settings may have a set of notification sounds or notification settings which differ from those associated with a second SIM and a second set of settings. The user may select a wide variety of user settings for each SIM.

In one embodiment, the dual SIM system manager 230 receives an incoming call or communication from a first UE 202 wishing to communicate with one or more of the UEs 202-210. The incoming communication in one example is tagged as directed to a phone number associated with a first SIM card. That first SIM card is identified as associated with a first UE 202 of the one or more UEs 202-210. The SIM determiner 232 will then identify that the first UE 202 is operating as a dual SIM device. The SIM determiner 232 may use information stored within the database 220 to determine if the first UE 202 is a dual SIM device. The SIM determiner 232 may also use an unstructured supplementary service data (USSD) code or the logs for an international mobile equipment identity (IMEI) number to determine if the first UE 202 is a dual SIM device. The SIM determiner 232 may also identify a multiple SIM serial numbers associated with the first UE 202 or multiple international mobile subscriber identities (IMSIs) for the first UE. As such, the dual SIM determiner 232, if more than one SIM is associated with a first UE, will tag the first UE 202 as operating as a dual SIM device. This triggers the dual SIM system manager 230 to send the incoming call to the preferences determiner 234.

In another embodiment, the request to communicate with a first SIM of the first UE 202 is initially screened by the dual SIM system manager 230. The first UE 202 was determined using the SIM determiner 232 to be operating as a dual SIM device having a first SIM and a second SIM operating therein. The preferences determiner 232 within the dual SIM system manager 230 operates to identify call preferences associated with the first SIM of the first UE 202. Preferences manager 234 can identify call preferences stored within database 220 associated with the first SIM of the first UE 202. Call preferences that may be determined by the preferences determiner 234 may be, but are not limited to, scam settings, blocked numbers, notification settings, do not disturb settings, automatic response settings, or other call or communication settings associated with the first SIM.

The call manager 236 is provided for implementing the preferences determined by the preferences determiner 234. For example, if the preferences determiner 234 determined that the first SIM has a preference to block all scam-likely calls, the call manager 236 would block the incoming call if it were a scam-likely call. Other preferences that the call manager may implement would be a unique notification sound for the first SIM verses the second SIM. The call manager may send an automatic response to a text message based on a preference determined by the preferences determiner 234. The incoming communication that may be managed by the call manager 236 may be a voice call, a SMS text message, a video call, email, or any other communication that may be received by the first SIM of the first UE.

Figure 3:
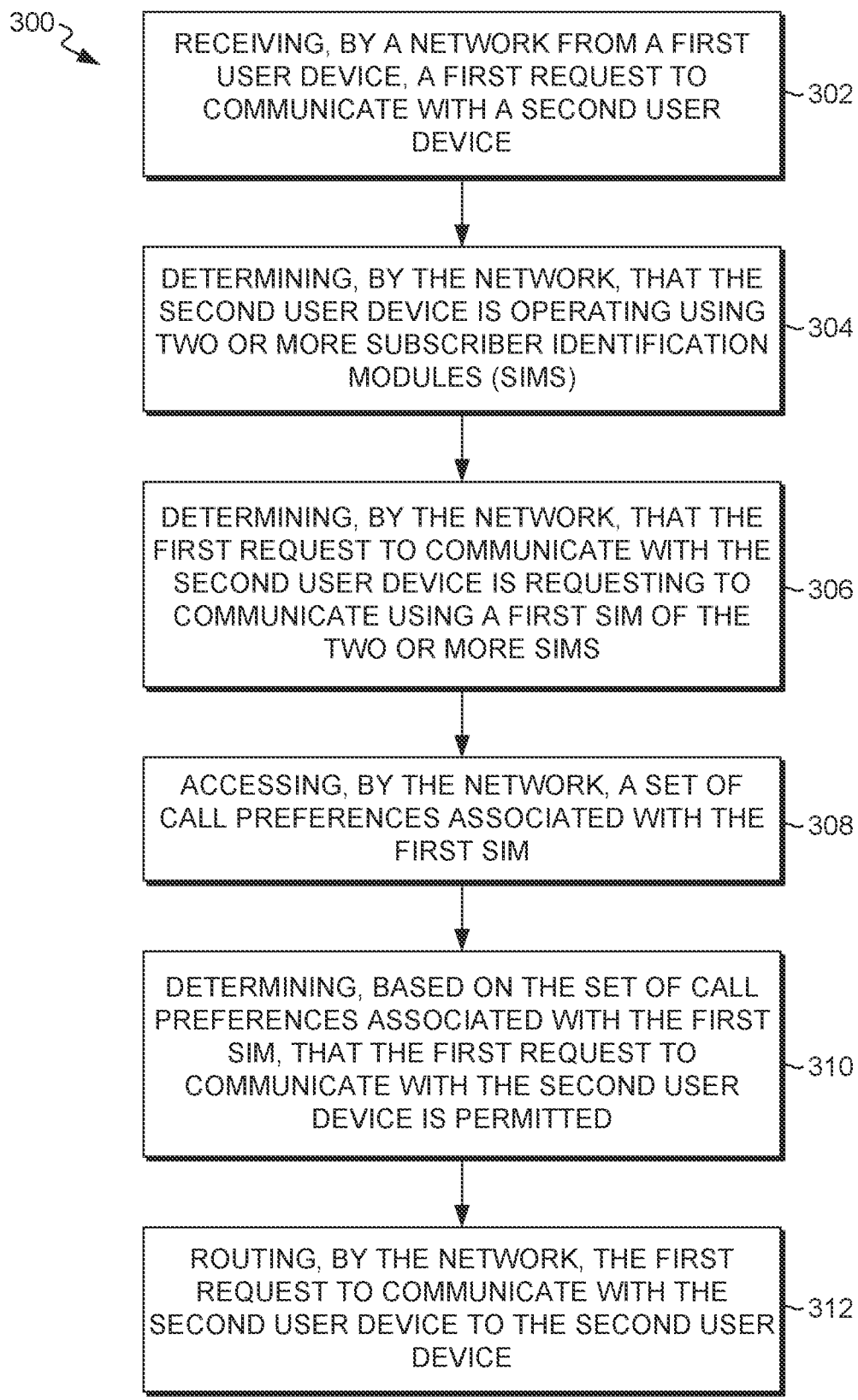
FIG. 3 is a flowchart of a method in accordance with aspects herein.

FIG. 3 is a flowchart of a method for managing a care agent avatar within a metaverse environment. The method 300 begins in step 302 with receiving from a first user device, by a network, a first request to communicate with a second user device. The inbound call or request to communicate is received at a network access point. The communication that is received is identified to be directed to a particular SIM associated with the second user device. The incoming communication may be any sort of communication such a voice call, a SMS text message, a video call, an email, or any other communication that may be sent to the SIM of the second UE.

At step 304, the network determines that the second user device is operating using two or more subscriber identification module (SIM) device. In aspects herein the network may be able to identify that the second UE is operating as a dual SIM device. To determine that the UE is operating as such, the network may access information stored within a database or within the UE to determine if the UE has more than one SIM operating thereon. The network may use information stored within the database to determine if the second UE is a dual SIM device. The network may also use an USSD code or the logs for an IMEI number to determine if the second UE is a dual SIM device. The network may also identify a multiple SIM serial numbers associated with the second UE or multiple IMSI for the first UE. Now looking at step 306, network determines that the first request to communicate with the second user device is associated with a first SIM of the two or more SIMs, The network may use information associated with the incoming communication such as a terminating SIM location or a terminating SIM number. That SIM will be registered or associated with the second UE and the network must determine which SIM of the two or more SIMs operating on the second UE to send the communication to. As such, the network may determine that the first SIM is associated with the incoming communication.

At step 308, the network will access a set of call preferences associated with the first SIM. The call preferences may be stored on a database associated with the second UE and the first SIM. The call preferences may be scam settings such as block all scam likely calls, block only certain numbers, allow all calls, block all calls within a particular time frame, set automatic responses and block call, set automatic response and allow call to go to voicemail, send call directly to voicemail, send automatic text response to call or text, or any other call setting. There may be other call settings that may not be described herein but may be within the scope of the system. The settings for the second UE may differ between the first SIM and the second SIM. Once the settings are accessed, the network at step 310, will then compare the call or incoming communication to the call settings and determine if the communication is permitted or if a setting prevents the communication. The network will determine how to proceed such as block the call, allow the communication, respond to the communication, allow the communication without any audible notifications, send the communication to voicemail, or any other response required by the call settings for the first SIM and what type of number it is. The network may also have a determiner that identifies scam likely calls.

Finally, at step 312, the network may implement the setting requirements based on the determined required response. For example, if a call is directed to the first SIM of the second UE and is determined to be a scam likely call, the settings associated with the first SIM may permit that call to go through. In another example, the settings may restrict scam likely calls and the network would then not allow the call to be communicated to the second UE. In another embodiment, a call may be within a restricted time by the settings, as such the call may be forwarded directly to voicemail based on call settings for the first SIM on the second UE.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A method of managing communications on a dual subscriber identification module (SIM) device comprising:
    in a network, receiving from a first user device a first request to communicate with a second user device;
    determining, by the network, that the second user device is operating using two or more SIMs;
    determining, by the network, that the first request to communicate with the second user device is associated with a first SIM of the two or more SIMs;
    accessing, by the network, a set of call preferences associated with the first SIM;
    determining, based on the set of call preferences associated with the first SIM, that the first request to communicate with the second user device is not permitted; and
    rejecting, by the network, the first request to communicate with the second user device.

2. The method of claim 1, wherein the first request to communicate with the second user device is a voice call.

3. The method of claim 1, wherein the first request to communicate with the second user device is an SMS text message.

4. The method of claim 3, wherein the first request to communicate with the second user device is a video call.

5. The method of claim 1, wherein the determining that the second user device is operating using two or more SIMs comprises identifying multiple international mobile subscriber identities associated with the second user device.

6. The method of claim 1, wherein the set of call preferences includes one or more scam call response settings.

7. The method of claim 6, wherein the one or more scam call response settings include a requirement to block all scam-likely communications to the first SIM.

8. The method of claim 7, wherein the first request to communicate with the second user device is determined to be a scam-likely communication.

9. One or more non-transitory computer-readable media having computer-executable instructions embodied thereon that, when executed, perform a method comprising:
    receiving from a first user device, by a network, a first request to communicate with a second user device;
    determining, by the network, that the second user device is operating using two or more subscriber identification modules (SIMs);
    determining, by the network, that the first request to communicate with the second user device is associated with a first SIM of the two or more SIMs;
    accessing, by the network, a set of call preferences associated with the first SIM;
    determining based on the set of call preferences associated with the first SIM, that the first request to communicate with the second user device is not permitted; and
    rejecting, by the network, the first request to communicate with the second user device.

10. The one or more non-transitory computer-readable media of claim 9, wherein the first request to communicate with the second user device is an SMS text message.

11. The one or more non-transitory computer-readable media of claim 10, wherein set of call preferences include one or more SMS text message response settings.

12. The one or more non-transitory computer-readable media of claim 11, wherein the one or more SMS text message response settings include a requirement to block all SMS text messages and send a first response to the first user device.

13. The one or more non-transitory computer-readable media of claim 9, wherein the first request to communicate with the second user device is a video call.

14. The one or more non-transitory computer-readable media of claim 9, wherein the determining that the second user device is operating using two or more SIMs comprises network by identifying multiple international mobile subscriber identities associated with the second user device.

15. A system for managing communications on a dual subscriber identification module (SIM) device, the system comprising:
    one or more processors; and
    one or more computer storage hardware devices storing computer-usable instructions that, when used by the one or more processors, cause the one or more processors to:
    receive from a first user device, by a network, a first request to communicate with a second user device;
    determine, by the network, that the second user device is operating using two or more subscriber identification modules (SIMs);
    determine, by the network, that the first request to communicate with the second user device is associated with a first SIM of the two or more SIMs;
    access, by the network, a set of call preferences associated with the first SIM;

determine based on the set of call preferences associated with the first SIM, that the first request to communicate with the second user device is permitted with a first notification; and communicating, by the network, the first request to communicate with the second user device to the second user device using the first notification.

16. The system of claim 15, wherein the first request to communicate with the second user device is a voice call.

17. The system of claim 16, wherein set of call preferences include one or more notification call settings.

18. The system of claim 17, wherein the one or more notification call settings include a requirement to send all calls to the second UE that are using the first SIM by way of the first notification.

19. The system of claim 15, wherein the first notification is a unique sound to the first SIM.

20. The system of claim 15, wherein the determining that the second user device is operating using two or more SIMs comprises network by identifying multiple international mobile subscriber identities associated with the second user device.

* * * * *